United States Patent [19]

Hawie

[11] Patent Number: 4,485,579
[45] Date of Patent: Dec. 4, 1984

[54] ROD HOLDER AND ALIGNMENT DEVICE

[75] Inventor: Robert L. Hawie, Stratford, Conn.

[73] Assignee: The Hawie Manufacturing Company, Bridgeport, Conn.

[21] Appl. No.: 532,308

[22] Filed: Sep. 15, 1983

[51] Int. Cl.³ ............................................. A01K 97/10
[52] U.S. Cl. ................................. 43/21.2; 248/512; 248/538
[58] Field of Search .......................... 43/21.2, 15, 17; 248/511, 512, 513, 538, 539

[56] References Cited

U.S. PATENT DOCUMENTS

| | | | |
|---|---|---|---|
| 2,981,509 | 4/1961 | Messenger | 43/21.2 |
| 3,259,346 | 7/1966 | Rogers | 248/538 |
| 3,417,502 | 12/1968 | Thomas | 43/21.2 |
| 3,570,793 | 3/1971 | Shackel | 43/21.2 |
| 4,014,127 | 3/1977 | Turner | 43/27.4 |
| 4,375,731 | 3/1983 | Budd | 43/21.2 |

Primary Examiner—Gene P. Crosby
Attorney, Agent, or Firm—Thomas L. Tully

[57] ABSTRACT

Multi-rod holder and alignment device which is removably-securable in non-rotating position within a conventional rod holder mounted on a boat. The device has a support stem having two or more lower alignment slots, and two or more upper rod-holder tubes which extend substantially vertically, relative to the support stem, each tube being designed to receive a fishing rod handle and having alignment pins for securing the fishing rod against rotation therewithin.

8 Claims, 4 Drawing Figures

U.S. Patent  Dec. 4, 1984  4,485,579
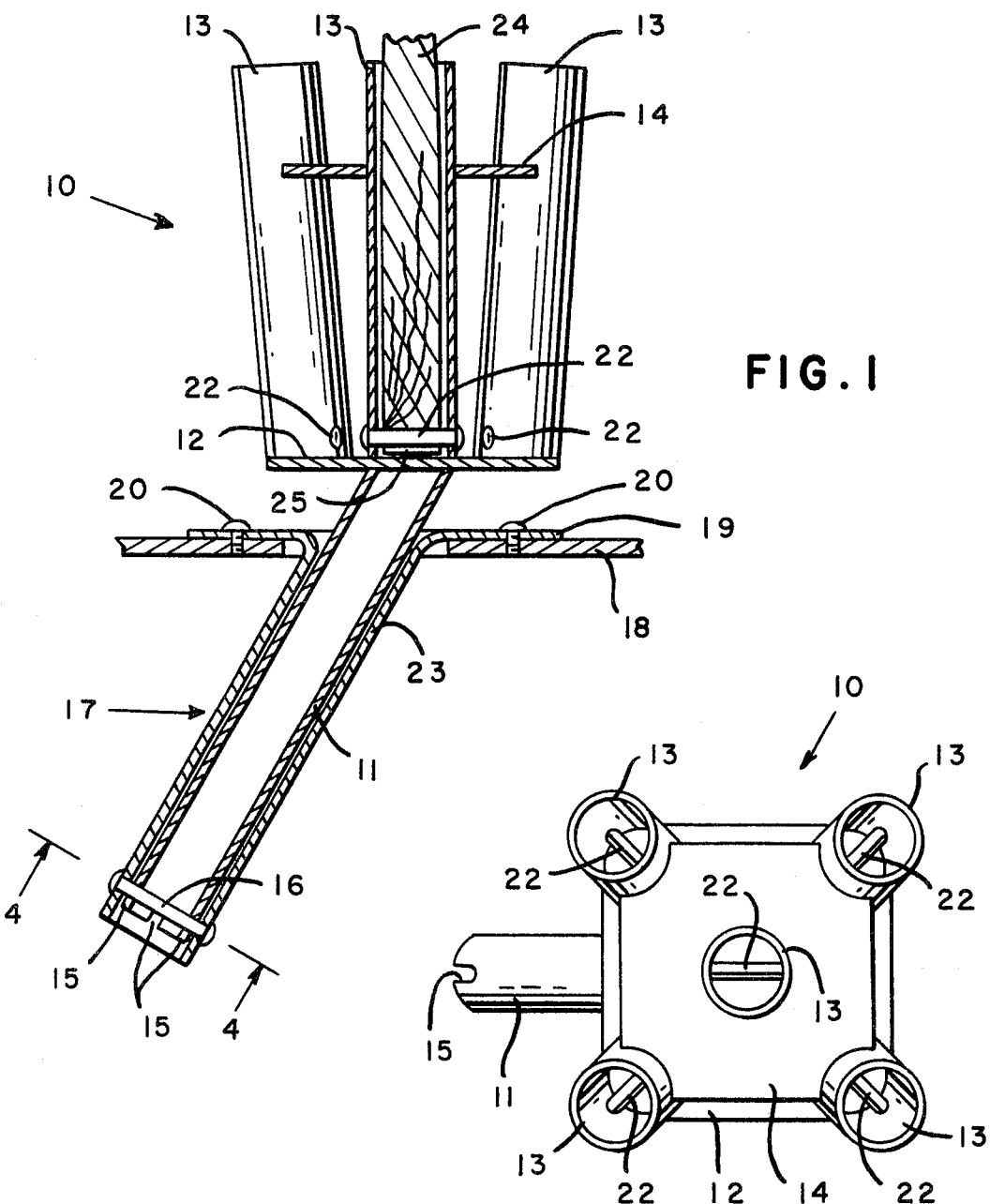
FIG. 1
FIG. 2
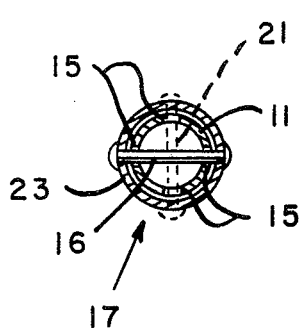
FIG. 4
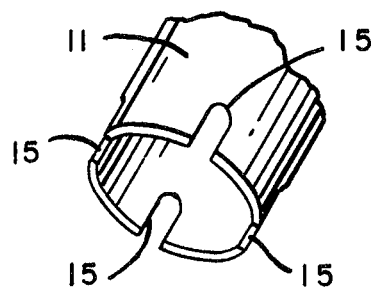
FIG. 3

ROD HOLDER AND ALIGNMENT DEVICE

BACKGROUND OF THE INVENTION

The present invention relates to a device for the holding or storage of a plurality of fishing rods, in non-interfering alignment, within a single gunwhale rod holder mounted on a fishing boat.

Fishing boats are generally furnished with a plurality of conventional inclined gunwhale rod holders, one or more of which are mounted within the gunwhale at each side of the boat and one or more of which may be mounted at the stern. Each said rod holder comprises a rod-receiving tube or well which is inclined at an angle acute from vertical, generally 30°, and which has a lower retainer cross-pin designed to be received within a conventional retainer slot present at the butt end of a large game fishing rod in order to hold the rod against rotation within the tube.

Gunwhale rod holders are designed to hold a single fishing rod in inclined position during trolling, and to prevent the rod and its reel from being rotated by the multi-directional pull of a large fish hooked during such trolling. When a fish is hooked, all other lines are reeled in, and all rods present in gunwhale rod holders which are near the active rod on which the fish is hooked are removed to prevent interference with the active rod and its line. The removed rods are generally laid on the deck and can be damaged by or can cause injury to the person attempting to land the large fish on the active rod.

Also, unless rods and their reels are maintained spaced from one another, the fishing line of one rod can become entangled with the reel of another rod. In the case of several entangled lines, separation can be time-consuming, resulting in the departure of a school of game fish, and can also cause injury or damage to the reels and/or fishing lines.

THE INVENTION

The aforementioned problems are overcome by the novel multiple rod holder and alignment device of the present invention which enables a plurality of inactive fishing rods to be stored out of the way and in aligned or oriented positions in a single gunwhale rod holder which is remote from the area of the boat occupied by a person having a large game fish engaged on a rod, whereby the inactive rods and their reels are temporarily stored out of the way and free from entanglement with each other.

The present multiple rod holder and alignment device comprises a cylindrical support stem designed to be received within a conventional gunwhale rod holder and having aligned slots which open upwardly from the base of the stem for receiving the alignment pin present near the bottom of the gunwhale rod holder tube or well, and at least two rod-receiving members which are supported by said stem in substantially parallel and substantially vertical position above said stem, each said member having a transverse diametric alignment pin near the base thereof designed to be received within the retainer slot present at the butt end of a fishing rod inserted within each said member, to retain the rods and their reels spaced from each other and to prevent rotation of the rods within the receiving members.

BRIEF DESCRIPTION OF THE DRAWING

FIG. 1 is a cross-section of a rod holder and alignment device according to a preferred embodiment of the present invention, said device being illustrated removably-secured within a conventional angular gunwhale rod holder mounted on the gunwhale of a boat;

FIG. 2 illustrates the device of FIG. 1 when viewed from above;

FIG. 3 is a perspective view of the base of the tubular support stem of the device of FIG. 1 illustrating the stem alignment slots, and FIG. 4 is a view taken along the line 4—4 of FIG. 1 and further illustrating the alternate direction of the stem retainer pin by means of broken lines.

DESCRIPTION OF THE INVENTION

Referring to the accompanying drawing which illustrates a preferred embodiment of the present invention, the rod holder and alignment device 10 of FIG. 1 comprises an angular support stem 11 such as a cylindrical stainless steel tube which extends downwardly at an angle of about 60° from a horizontal support plate 12, such as a flat rectangular stainless steel plate which is welded to the upper end of the support stem 11, and five substantially vertical and substantially parallel rod-receiving members 13, such as cylindrical stainless steel tubes, the lower end of each being welded to the upper surface of the support plate 12 to attach the members 13 in spaced relation to each other and in substantially vertical position, the upper end of each member 13 being open to receive and support a fishing rod. A second intermediate support plate 14, such as of flat stainless steel, is also welded to outer surfaces of the five rod-receiving members 13 in order to provide additional support and strength to the members 13, as shown more clearly by FIG. 2.

The lower end of the angular support stem 11 is provided with at least one pair, and preferably two perpendicular pairs of diametrically-longitudinal stem-alignment slots 15, shown most clearly in FIG. 3. The slots 15 open to the lower end of stem 11 and are designed to receive the diametric stem alignment pin 16 which is present adjacent the lower end of the angular cylindrical tube 23 of a conventional angular gunwhale rod holder 17 which is attached to the gunwhale 18 of a fishing boat by means of bolts 20 passing through the integral horizontal flange 19. The angle of inclination of tube 23 down from the horizontal flange 19 is the same as the angle of inclination of the support stem 23 down from its horizontal support plate 12, i.e. about 60°. The engagement between slots 15 and pin 16 secures the support stem against rotation.

The conventional gunwhale rod holder 17 comprises the angular cylindrical tube 23, such as of stainless steel, which is similar in inner and outer diameter to the members 13 of the device 10. Commonly the inner diameter of tube 23 and of members 13 is formed by a thin layer of cushion material such as rubber. The transverse diametric stem alignment pin 16 may be present on tube 23 either extending in the direction of inclination of the tube 23, as shown in FIG. 1, or in a direction perpendicular thereto, as shown by means of broken lines in FIG. 4, illustrating the alternative direction pin 21, depending upon the type of gunwhale rod holder 17 present. In order to adapt the present multi-rod holder 10 for use with both types of holders 17, the present holder 10 is provided with a pair of diametrically-opposed slots 15 extending in both directions, as shown by FIG. 3.

The tubular stem 11 of the present device 10 has an outer diameter which is slightly smaller than the inner diameter of the receiving tube 23 of the gunwhale rod holder 17, or of its cushion lining, if present, so that the former can be received securely within the latter, and the length of stem 11 is sufficient to permit the stem alignment pin 16 to be received and seated within a diametrically-opposed pair of slots 15 while the support plate 12 of device 10 is positioned closely spaced above and substantially parallel to the gunwhale 18 of the boat.

Also critical to the present multi-rod support and alignment device 10 are the transverse diametric rod alignment pins 22 which are present, one each, adjacent the lower ends of the rod-receiving members 13 but spaced above the upper surface of support plate 12, as illustrated by FIGS. 1 and 2. The adjacent pins 22 may be oriented in directions different from the direction of pins 22 in nearby rod-receiving members 13 so that each rod 24, present in a member 13 and having its butt end slot 25 in engagement with a rod alignment pin 22, is secured against rotation within its member 13 and is aligned so that its attached reel is oriented in a direction different from the direction of orientation of the reel attached to a rod secured within an adjacent member 13. This is important if the holders 13 are close to each other because the reels of large fishing rods are large and may contact each other unless adjacent rods are supported with their reels extending in different directions. Such contact may prevent adjacent rods from being properly secured within the members 13 and/or may cause damage to the reels or snagging of the fishing lines.

As shown by FIG. 2, illustrating a device 10 having five rod-receiving members 13, the pairs of diagonally-opposed outer members 13 have their rod-alignment pins 22 extending in the same diagonal direction since they are well-spaced from each other. Thus, each adjacent outer member 13 has its pin 22 extending in a direction which is 90° different from the next, and the central member 13 has its pin 22 extending in a direction which is 45° different from each of the others.

Also in the device 10 of FIG. 1, the four outer rod-receiving members 13 are shown slightly inclined outwardly from center in order to provide greater spacing between the rods and reels secured within adjacent members 13 while minimizing the dimensions of the lower support plate 12. The members 13 are still considered to be substantially parallel to each other and to extend substantially vertically relative to the support plate 12 and the gunwhale 18. If desired, the support plates 12 and/or 14 may be omitted by forming the diagonally-opposed rod-receiving tubular members from U-shaped tubular pipes, two or more such pipes being joined to each other and to the support stem to form a multi-rod holder device similar to that of FIG. 1, the tubular pipes being provided with rod-alignment pins similar to pins 22 of FIGS. 1 and 2.

While the device 10 of the drawing is preferably formed from stainless steel, it will be clear to those skilled in the art that such devices can also be formed from other metals such as aluminum and/or from strong plastics such as acrylonitrile-butadiene-styrene (ABS) or polycarbonates. Also, the device 10 can include any practical plural number of rod holders 13. Generally, it is desirable to be able to accommodate as many rods or other elongate elements such as gaffs or spears in a single gunwhale rod holder.

While the present rod holders 17 are generally referred to herein as gunwhale rod holders, it should be understood that such rod holders conventionally are mounted in areas of a fishing boat in addition to the gunwhale, such as on the transom, on railings, on the bridge or on other areas of the superstructure. Therefore, the phrase rod holder is used herein as generic to holders such as 17 regardless of their place of attachment on a fishing boat.

Variations and modifications within the scope of the appended claims will be apparent to those skilled in the art in the light of the present disclosure.

I claim:

1. A multi-rod holder and alignment device designed to be inserted within the receptor tube of a conventional rod holder on a boat and to engage the diametric alignment pin present adjacent the base of said tube, to adapt the rod holder to support a plurality of fishing rods in secured and aligned position, said device comprising an elongate support stem designed to be received within the receptor tube of a conventional rod holder and having diametrically-opposed longitudinal slots which open upwardly from the base of said stem to receive and engage said alignment pin, said elongate support stem having an upper end of sufficient length to extend up out of the rod holder, a plurality of spaced rod holders which are connected to the upper end of said support stem and which extend substantially vertically upwardly, each said spaced rod holder having an upper rod-receiving opening and a lower interior diametric rod-aligning pin designed to be received within the conventional transverse slot present at the butt end of a large fishing rod, whereby said device is designed to be secured against rotation by engagement within the rod holder and to hold a plurality of fishing rods in rotation resistant substantially vertical alignment above said rod holder.

2. A device according to claim 1 in which said support stem is inclined at an angle from the vertical, to be received within the receptor tube of a conventional rod holder which is also inclined at a similar angle from the vertical, said plurality of rod holders being connected at an angle relative to said support stem so as to extend substantially vertical thereabove.

3. A device according to claim 1 in which said rod holders are attached, adjacent the bases thereof, to a horizontal support plate which is attached to said support stem.

4. A device according to claim 3 in which said support plate is rectangular and has a rod holder attached adjacent each of the four corners thereof.

5. A device according to claim 4 in which a fifth rod holder is attached to said plate at the center thereof.

6. A device according to claim 1 in which an upper support member is attached to each of said rod holders, adjacent the upper ends thereof, to connect said rod holders to each other and strengthen said device.

7. A device according to claim 1 in which the base of said support stem comprises two perpendicular pairs of said opposed slots.

8. A device according to claim 1 in which each said rod holder comprises a cylindrical tubular member having a length and inner diameter similar to the receptor tube of a conventional rod holder.

* * * * *